Patented Nov. 22, 1938

2,137,287

UNITED STATES PATENT OFFICE 2,137,287

DIAMIDES OF ORGANIC DICARBOXYLIC ACIDS AND PROCESS OF PRODUCING SAME

Heinrich Hopff and Helmut Ohlinger, Ludwigshafen-on-the-Rhine, Germany, assignors to General Aniline Works, Inc., New York, N. Y., a corporation of Delaware No Drawing. Application March 5, 1936, Serial No. 67,300. In Germany March 9, 1935

8 Claims. (Cl. 260—281)

The present invention relates to diamides and imides of dicarboxylic acids of organic compounds and a process of producing same.

Monocarboxylic amides can be obtained by the action of carbamic acid chloride on aromatic hydrocarbons in the presence of anhydrous aluminium chloride.

We have now found that two carboxylic amide groups can be introduced into polynuclear compounds containing at least one aromatic radicle (i. e. aromatic hydrocarbons containing at least 2 nuclei and heterocyclic compounds containing besides at least one heterocyclic nucleus at least one aromatic nucleus), by causing at least two molecular proportions of a carbamic acid chloride (i. e. carbamic acid chloride itself or its alkyl substitution products) and at least two molecular proportions of an anhydrous condensing agent of the Friedel-Crafts type to act on one molecular proportion of a polynuclear compound of the type defined above. Thus by the treatment of 1 molecular proportion of diphenyl with at least 2 molecular proportions of carbamic acid chloride in the presence of at least two molecular proportions of anhydrous aluminium chloride, diphenyl-4,4'-dicarboxylic amide is obtained in excellent yields. Other polynuclear aromatic hydrocarbons, such as terphenyl and the like, react in a similar manner, as do also aromatic hydrocarbons with two or more condensed nuclei. If the two carboxylic amido groups enter into the peri-position of the hydrocarbon, dicarboxylic imides may be obtained instead of diamides. Thus acenaphthene-5,6-dicarboxylic imide is obtained in a good yield from acenaphthene by employing the corresponding amounts of carbamic acid chloride and anhydrous aluminium chloride.

As condensing agents of the Friedel-Crafts type may be mentioned aluminium chloride and bromide and also sublimed iron chloride and similar compounds.

Instead of the readily decomposable carbamic acid chloride or its alkyl substitution products, the stable molecular compounds obtainable according to the copending application Ser. No. 47,228 filed on October 29th, 1935, as for example the compound derived from carbamic acid chloride and anhydrous aluminium chloride, may advantageously be employed. The reaction of the aromatic hydrocarbons with these molecular compounds is effected by heating the two components, if desired in the presence of inert diluents or solvents, until no further hydrogen chloride is split off.

The working up of the reaction mixture is advantageously effected by decomposing the reaction mixture with water or ice and isolating the deposited dicarboxylic amide or imide in a suitable manner, as for example by filtration by suction.

The following examples will further illustrate the nature of this invention, but the invention is not restricted to these examples. The parts are by weight.

Example 1

154 parts of diphenyl, 640 parts of the molecular compound derived from 37.5 per cent of carbamic acid chloride and 62.5 per cent of aluminium chloride obtainable according to the application Ser. No. 47,228 filed on October 29th, 1935, and 300 parts of commercial dichlorbenzene are heated while gradually raising the temperature from 60° to 140° C. until the splitting off of hydrogen chloride has ceased. The dark-colored melt is decomposed with water and the deposited 4,4'-diphenyldicarboxylic amide is filtered off by suction. After boiling with glacial acetic acid, from 230 to 240 parts of a crude white product are obtained which may be converted into the free 4,4'-diphenyl-dicarboxylic acid by boiling with acids. By employing a corresponding amount of pyrene or fluorene instead of diphenyl, the corresponding dicarboxylic diamides are obtained in very good yields.

Example 2

154 parts of acenaphthane, 640 parts of the molecular compound derived from 37.5 per cent of carbamic acid chloride and 62.5 per cent of aluminium chloride and 300 parts of commercial dichlorbenzene are gradually heated from 60° to 150° C. until the evolution of hydrogen chloride has ceased and then worked up as described in Example 1. 234 parts of crude product are obtained which consists mainly of acenaphthene-5,6-dicarboxylic imide and can be converted by saponification into the free acenaphthene-5,6-dicarboxylic acid corresponding to the formula

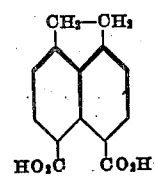

The latter is converted by heating at elevated temperature into the anhydride which dissolves in concentrated sulphuric acid giving a yellow coloration and beautiful blue fluorescence.

Example 3

332 parts of fluorene (2 mols) are heated together with 1500 parts of dichlorbenzene up to from 60 to 70° C. 1300 parts of the molecular compound obtainable according to the process of the above mentioned application Ser. No. 47,228 filed on October 29th, 1935 from carbamic acid chloride and anhydrous aluminium chloride (containing 6 mols of carbamic acid chloride) are added and the mixture is heated for 2 hours at 150° C. The reaction mixture is decomposed with ice or water and subjected to steam distillation. Fluorene dicarboxylic acid diamide is obtained practically in the theoretical yield. After recrystallization from glacial acetic acid its melting point is 292° C.

Example 4

270 parts of stilbene (1.5 mols) are heated together with 500 parts of trichlorbenzene up to from 70 to 80° C. 900 parts of the molecular compound obtainable according to the process of the above mentioned application Ser. No. 47,228, filed on October 29th, 1935, from carbamic acid chloride and anhydrous aluminium chloride (containing 4.5 mols of carbamic acid chloride) are added and the mixture is heated for 2 hours at from 120° to 130° C. The reaction mixture is decomposed with ice. The crude product obtained by steam distillation is dissolved in hot glacial acetic acid and decolorized by means of charcoal. During cooling of the solution stilbene dicarboxylic acid diamide precipitates. After recrystallization from glacial acetic acid it melts at from 322 to 323° C. By boiling with caustic soda solution it may be converted into stilbene dicarboxylic acid.

Example 5

252 parts of diphenylene oxide (1.5 mols) are heated in 500 parts of tetrachlorethane up to from 80 to 90° C. 900 parts of the molecular compound obtainable according to the process of the above mentioned application Ser. No. 47,228, filed on October 29th, 1935, from carbamic acid chloride and anhydrous aluminium chloride (containing 4.5 mols of carbamic acid chloride) are added and the mixture is heated for 2 hours at from 140° to 150° C. The reaction mixture is decomposed with ice or water and distilled with steam. After cooling the diamide is filtered off by suction and dried in vacuo at 80° C. After recrystallization from glacial acetic acid its melting point is 307 to 308° C. By boiling with dilute caustic soda solution diphenyleneoxide dicarboxylic acid is obtained in practically the theoretical yield.

Instead of adding the said addition compound 4.5 mols of liquid carbamic acid chloride may be added to the solution of 2 mols of diphenylene oxide in tetrachlorethane mixed with 4.5 mols of AlCl₃, the mixture then being heated to from 140° to 160° C. and worked up as described above.

Example 6

228 parts of chrysene (1 mol) are heated in about 1000 parts of dichlorbenzene or tetrachlorethane up to 80° C. At this temperature 700 parts of the molecular compound obtainable according to the process of the above mentioned application Ser. No. 47,228, filed on October 29th, 1935, from carbamic acid chloride and anhydrous aluminium chloride (containing 3 mols of carbamic acid chloride) are added and the mixture is heated for 2 hours at 150° C. The reaction mixture is decomposed with ice or water and distilled with steam. The chrysene dicarboxylic acid diamide obtained may be recrystallized from glacial acetic acid.

Example 7

504 parts of carbazole (3 mols) are heated in 2000 parts of dichlorbeneze to from 70 to 80° C. 3100 parts of the molecular compound obtainable according to the process of the above mentioned application Ser. No. 47,228, filed on October 29th, 1935, from carbamic acid chloride and anhydrous aluminium chloride (containing 12 mols of carbamic acid chloride) are added and the mixture is heated for 3 hours to from 150 to 160° C. By working up as described in Example 6 carbazole dicarboxylic acid diamide is obtained.

Example 8

202 parts of pyrene (1 mol) are heated with 500 parts of dichlorbenzene up to 70° C. 630 parts of the molecular compound obtainable according to the process of the above mentioned application Ser. No. 47,228, filed on October 29th, 1935, from carbamic acid chloride and anhydrous aluminium chloride (containing 3 mols of carbamic acid chloride) are added and the mixture is heated from 3 hours at 150° C. After decomposition with ice, steam distillation and recrystallization from nitrobenzene pyrene dicarboxylic acid diamide is obtained in the form of needle-like crystals.

Example 9

190 parts of fluoranthene (1 mol) are mixed with 266 parts of anhydrous aluminium chloride and heated in about 1000 parts of dichlorbenzene up to 80° C. 320 parts of liquid carbamic acid chloride (4 mols) are added and the mixture is then heated to from 140° to 160° C. The reaction mixture is decomposed with ice or plenty of water and distilled with steam. After cooling the diamide is filtered off by suction and dried in vacuo at 100° C.

Example 10

218 parts of 2,3-benzodiphenylene oxide (brasane) (1 mol) are heated with 500 parts of dichlorbenzene up to 70° C. The mixture is further treated and worked up as described in Example 8.

What we claim is:

1. The process for the production of substances selected from the class consisting of dicarboxylic acid diamides and imides, which comprises treating one molecular proportion of a polynuclear compound containing at least one aromatic nucleus with at least two molecular proportions of a substance selected from the class consisting of carbamic acid chlorine and its alkyl substitution products and at least two molecular proportions of a condensing agent of the Friedel-Crafts type in the presence of an inert diluent.

2. The process for the production of substances selected from the class consisting of dicarboxylic acid diamides and imides, which comprises treating one molecular proportion of a polynuclear aromatic hydrocarbon with at least two molecular proportions of carbamic acid chloride and at least two molecular proportions of aluminium chloride.

3. The process for the production of substances selected from the class consisting of dicarboxylic acid diamides and imides, which comprises treating one molecular proportion of a heterocyclic compound containing at least one heterocyclic nucleus and at least one aromatic nucleus with at least two molecular proportions of carbamic acid chloride and at least two molecular proportions of aluminium chloride.

4. The process for the production of acenaphthene-5,6-dicarboxylic imide, which comprises heating one molecular proportion of acenaphthene with at least two molecular proportions of liquid carbamic acid chloride and at least two molecular proportions of anhydrous aluminium chloride.

5. In the process as claimed in claim 4, employing the said proportions of carbamic acid chloride and of anhydrous aluminium chloride in the form of the stable molecular compound obtainable from the said two compounds.

6. Acenaphthene-5,6-dicarboxylic acid imide.

7. The process for the production of substances selected from the class consisting of dicarboxylic acid diamides and imides, which comprises treating one molecular proportion of a polynuclear compound containing at least one aromatic nucleus with at least two molecular proportions of a substance selected from the class consisting of carbamic acid chloride and its alkyl substitution products and at least two molecular proportions of an anhydrous condensing agent of the Friedel-Crafts type.

8. The process for the production of substances selected from the class consisting of dicarboxylic acid diamides and imides, which comprises treating one molecular proportion of a polynuclear compound containing at least one aromatic nucleus with at least two molecular proportions of a stable molecular compound from a substance selected from the class consisting of carbamic acid chloride and its alkyl substitution products and a condensing agent of the Friedel-Crafts type.

HEINRICH HOPFF.
HELMUT OHLINGER.